(12) United States Patent
Ogston

(10) Patent No.: US 7,121,007 B2
(45) Date of Patent: Oct. 17, 2006

(54) CUTTING ASSEMBLY FOR REMOVING A WINDSHIELD AND METHOD RELATING TO SAME

(75) Inventor: Alfred John Ogston, Calgary (CA)

(73) Assignee: Crystal Glass Canada Ltd., Edmonton (CA)

(*) Notice: Subject to any disclaimer, the term of this patent is extended or adjusted under 35 U.S.C. 154(b) by 0 days.

(21) Appl. No.: 11/038,893

(22) Filed: Jan. 18, 2005

(65) Prior Publication Data

US 2005/0126359 A1  Jun. 16, 2005

Related U.S. Application Data

(60) Division of application No. 09/633,074, filed on Aug. 4, 2000, now Pat. No. 6,862,968, which is a continuation of application No. 08/781,954, filed on Dec. 2, 1996, now abandoned.

(51) Int. Cl.
*B26B 7/00* (2006.01)
*B32B 35/00* (2006.01)

(52) U.S. Cl. ............ 30/169; 30/277; 30/277.4; 30/315; 30/339; 30/344; 15/93.1; 156/584

(58) Field of Classification Search ............ 30/169, 30/277, 277.4, 315, 337, 339, 342, 344, 500, 30/314; 15/93.1, 236.01, 236.02; 83/13, 83/22, 945; 173/170; 156/344, 584
See application file for complete search history.

(56) References Cited

U.S. PATENT DOCUMENTS

| | | | |
|---|---|---|---|
| 712,843 A | 11/1902 | Paul | 30/277 |
| 1,032,370 A | 7/1912 | Bayley e al. | 30/277 |
| 2,139,769 A * | 12/1938 | Oslund | 30/136 |
| 2,621,614 A | 12/1952 | Walling | 173/170 |
| 2,800,672 A * | 7/1957 | Gilyan | 15/105 |
| 3,092,411 A * | 6/1963 | Hardy | 30/169 X |
| 3,104,410 A | 9/1963 | Ames | 30/169 |
| 3,267,516 A * | 8/1966 | Eckhaus | 30/169 X |
| 3,683,496 A * | 8/1972 | Johnson | 30/169 |
| 3,853,495 A | 12/1974 | Shire | 30/169 |
| 4,395,825 A | 8/1983 | Lock | 30/272 |
| 4,598,476 A | 7/1986 | Grasse | 30/344 |
| 4,620,369 A | 11/1986 | Gercken | 30/344 |
| 5,040,614 A | 8/1991 | Nash | 30/277 |
| 5,219,378 A | 6/1993 | Arnold | 30/337 |
| 5,251,352 A * | 10/1993 | Cullison | 30/169 X |
| 5,287,582 A | 2/1994 | Kawai et al. | 30/169 |
| 5,301,429 A | 4/1994 | Bundy | 30/277 |
| 5,435,063 A | 7/1995 | Russo | 30/344 |
| 5,469,623 A | 11/1995 | Roeker et al. | 30/169 |
| 5,480,507 A | 1/1996 | Arnold | 30/500 |
| 5,606,761 A | 3/1997 | Lynch | 30/169 |
| 5,640,772 A | 6/1997 | Roeker et al. | 30/169 |
| 5,956,788 A * | 9/1999 | Henke | 7/105 |
| 5,979,058 A * | 11/1999 | Henke | 30/169 X |
| 6,178,645 B1 | 1/2001 | Lock | 30/277.4 |
| 6,640,369 B1 * | 11/2003 | Malvasio | 7/105 |

* cited by examiner

*Primary Examiner*—Clark F. Dexter
(74) *Attorney, Agent, or Firm*—Sheridan Ross P.C.

(57) ABSTRACT

The cutting assembly functions to sever the urethane bed bonding a windshield to a vehicle. The assembly comprises a reciprocating air gun connected with a cutting blade by a shaft. The blade has a straight front cutting edge about 4 inches in width. The blade is reciprocated in and out of the bed to sever it.

4 Claims, 3 Drawing Sheets

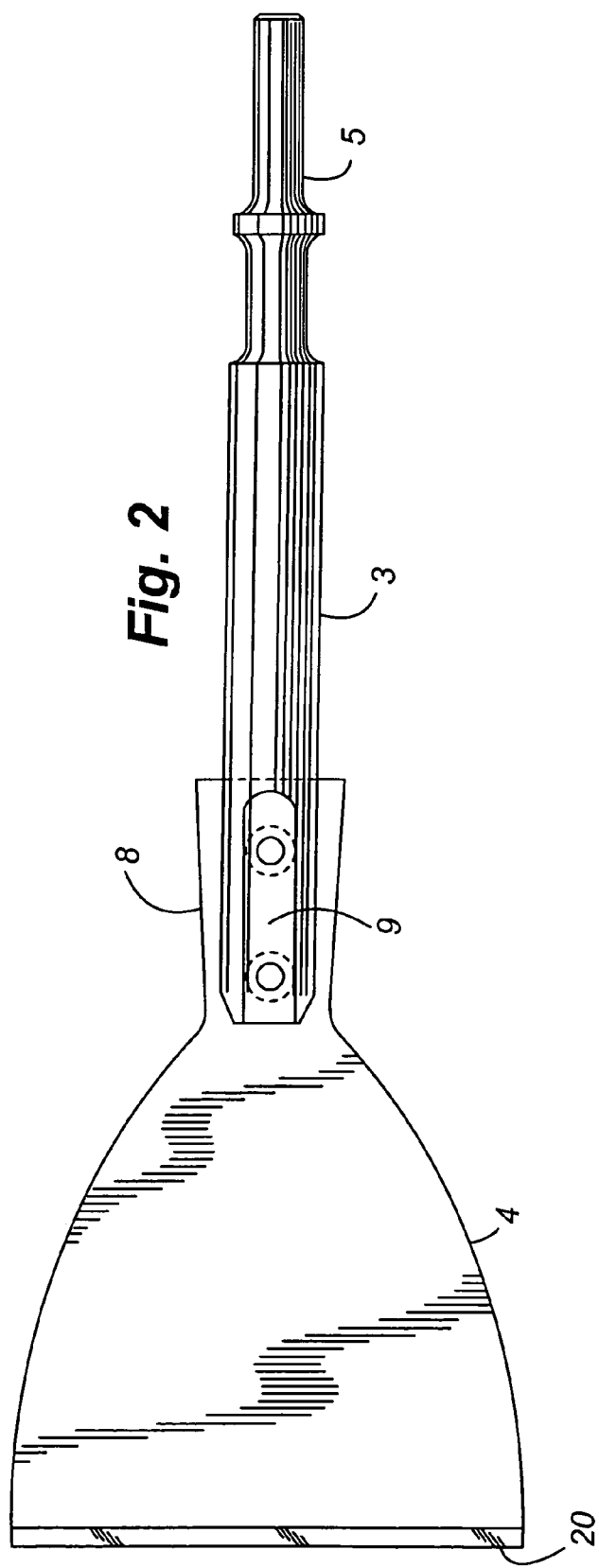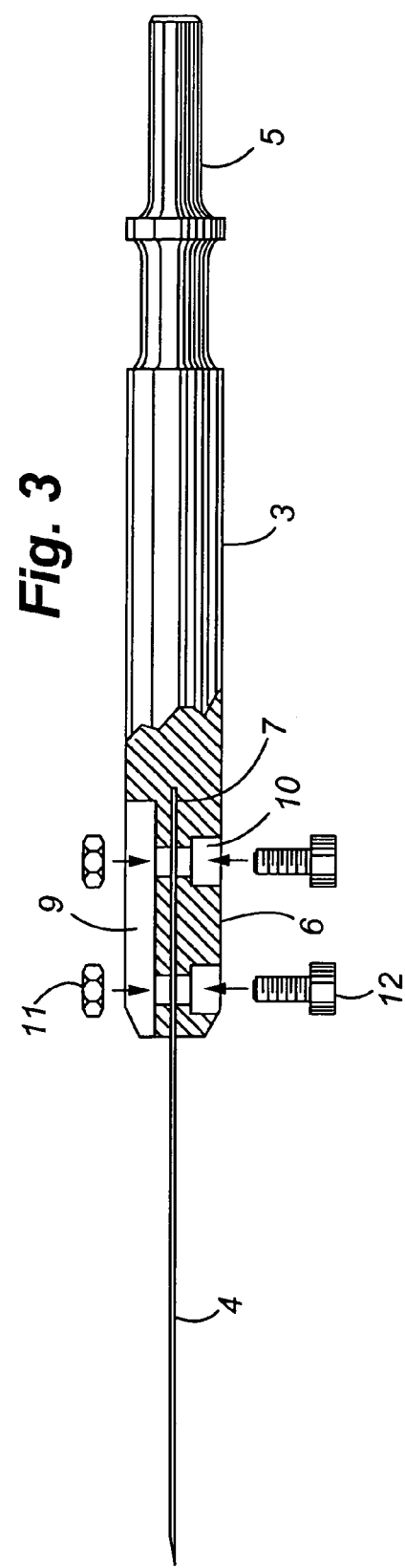

CUTTING ASSEMBLY FOR REMOVING A WINDSHIELD AND METHOD RELATING TO SAME

CROSS REFERENCE TO RELATED APPLICATIONS

This application is a divisional of prior pending U.S. patent application Ser. No. 09/633,074 filed Aug. 4, 2000, now U.S. Pat. No. 6,862,968 which is a continuation of U.S. patent application Ser. No. 08/781,954 filed Dec. 2, 1996 now abandoned. The entire disclosures of the prior applications are incorporated herein it their entireties.

FIELD OF THE INVENTION

This invention relates to an assembly and method for separating a glass windshield from a vehicle urethane bed by severing the bed along its length.

BACKGROUND OF THE INVENTION

In the process of securing a glass windshield to a new car or truck, the manufacturer first extrudes a bead or "bed" of urethane onto the "pinch weld" extending around the perimeter of the window opening. The urethane bed bonds to the pinch weld surface. The glass windshield then is seated on the bed and bonds to it, forming a liquid-tight seal.

The urethane bed is hard and tough and not easily penetrated. It commonly has a thickness of about ¼ inch and width of about ⅓–¾ inches, widening to about 3½–4" at the corners.

If the windshield is to be replaced, an installer severs the bed along its length, just beneath the inside surface of the glass, leaving the base portion of the bed in place. He then primes the cut surface of the bed, deposits a new bead of urethane on the primed surface and seats the replacement windshield onto the fresh bead to bond it in place.

Up to about the end of the 1980's installers used a manually operated knife to sever the urethane bed. The knife was generally L-shaped, having a narrow sharpened blade and a shank or handle equipped with hand grips. The installer would first work the point of the blade inwardly to penetrate the bed and would then reciprocate the blade with short in and out strokes while pulling the blade sideways to saw through the urethane bed along its length.

Commencing about 1990, two types of powered tools were introduced commercially, to replace the manually operated tools. These powered tools mimicked the manually operated knife in several structural and operational respects.

The first type of tool involved an L-shaped blade and shank powered by an electric motor. The blade was oscillated from side to side. The blade was pointed at its end and narrow (about ½ inch wide), to facilitate initial manual penetration. The side edge of the blade was sharpened, so that a lateral cutting action was produced.

The second type of tool involved reciprocating a blade which would extend in and out of a sleeve. The blade was actuated by an electric motor. Again, the blade was pointed and narrow (about ½ inch width), to facilitate initial penetration. The "throw" or distance advanced by the blade was short, about ½ inch.

In use, these tools were characterized by several problems. More particularly:

Cutting with them was slow. The depth and width of the cut were small, requiring a great many cuts to complete the job. Typically it would take about 15–20 minutes to cut the windshield free;

Using the prior art assemblies was laborious. The installer would have to apply a sideways pull to these tools, particularly when cutting along the horizontal legs of the bed;

It was common to crack the glass when first penetrating the bed. This could leave broken glass on the dash and elsewhere, which was undesirable;

The cuts made by the tools were shallow. One could only cut into the bed with these tools about ½ inch at a time. This meant that at the corners, where the bed width was greatest, it would take prolonged cutting to complete severing the bed. In practice, the installer would revert to using a hand knife at the corners or would break off the glass at the corners and have to later complete the cut by hand of the corner urethane with its embedded glass. In the course of hand cutting the corners, the installer would commonly press hard with his head against the windshield to assist his cutting—this was known to lead to neck injuries;

The cut surface produced by the blades of these powered tools was irregular (jagged and undulating). This was undesirable as the newly extruded bead would in part reproduce this underlying irregularity and the new windshield would then not seat flush against the bed surface. This could lead to a poor seal and subsequent leaking;

The electric motor-driven tools of the prior art were generally bulky and difficult to work with in confined space, such as the apex between the vehicle dashboard and the inside surface of the windshield;

The prior art blades were fragile and expensive—breakage was a problem; and

It was necessary to use soapy water as a coolant and lubricant for the narrow, rapidly moving blades. After the cut was complete, the cut surface needed to be carefully washed to remove soap, as it was detrimental to getting a good bond when new urethane was laid on.

SUMMARY OF THE INVENTION

The preferred form of the invention involves combining the following features:

using a reciprocating air gun which delivers a high impact blow with a stroke length of about ½ inch;

matching the air gun with a wide, flat blade having a transverse, straight front cutting edge which is at least 2 inches wide and preferably is about 4 inches wide. The blade should be stiff but have sufficient lateral flexibility so as to conform to the curvature of the windshield when manually pressed thereagainst—preferably the blade can be about 4 inches in length and formed of about 0.05 inch thick stainless steel;

the blade should also narrow from its front cutting edge to its rear connection end. This allows the blade to be twisted by the user as it is being worked around a corner;

connecting the blade with the gun with a slender, elongate, substantially rigid shaft which will transmit the impact yet can extend into the narrow apex space between the dashboard and the windshield while spacing the gun well away from this confined area;

the blade and shaft being substantially coplanar so there are no significant protrusions at the connection point between blade and shaft.

It has been found that this combination provides a cutting assembly having the following attributes:

The air gun is capable of driving the wide blade into the tough urethane bed to make a clean incision without damage to the bed;

The cutting stroke and blade are sufficiently long to enable the blade to cut through even the wide corners of the bed—this can typically be accomplished in 4 or 5 strokes;

No side pull is required—the blade cuts with an in and out stroke. The installer need only support and guide the device and does not need to press with his head against the inner surface of the windshield;

Narrowing the blade from front to back enables the user to twist it somewhat to facilitate cutting at the corners and minimizes having protruding structure at the connecting point of blade and shaft, which could cause damage to the dashboard or windshield;

Surprisingly, the cut surface of the bed is found to be smooth and free of irregularities;

Blade breakage is reduced; and

The removal of a windshield is accomplished in about 3 minutes as compared to the 15–20 minutes required for the prior art assemblies.

In one broad aspect, the invention involves a windshield removal assembly for cutting a urethane bed securing a glass windshield having a curved surface to a vehicle at an edge of a windshield opening formed by the vehicle, there being a narrowing apex space between the windshield and a vehicle part forming the opening, comprising: a reciprocating air gun; a rigid, elongated shaft having inner and outer ends and being connected at its inner end with the gun for reciprocation thereby; and a flat thin steel blade of substantially constant thickness, said blade having front and rear ends, the blade rear end being connected to the shaft's outer end, the blade being substantially coplanar with the shaft, the blade having a substantially straight front edge which is beveled on one side only to provide a non-sharpened top edge and a sharpened bottom cutting edge, the blade narrowing from its front end to its rear end to about the width of the shaft, the blade being sufficiently rigid to cut the urethane bed when reciprocated by the air gun but having sufficient lateral flexibility to conform to the curved surface of the windshield when pressed there against; the shaft being operative to space the blade from the gun sufficiently to allow the assembly to be used within the confines of the apex space; the air gun being operative to reciprocate the shaft and blade with sufficient force to advance the blade through the urethane bed; the blade being configured so that the non-sharpened top edge of the blade can be pressed against the glass of the windshield while the sharpened bottom cutting edge penetrates the urethane bed.

In another broad aspect, the invention involves a method for separating a glass windshield from a vehicle urethane bed, comprising: providing a reciprocating air gun having a cutting tool mounted thereto for reciprocation thereby, said cutting tool comprising a shaft connected at one end with the gun and at the other end with a flat blade having a front cutting edge of at least 2 inches width; reciprocating the blade longitudinally, into and out of the bed, and severing the bed across its width; and progressively moving the blade along the length of the bed to sever it completely and leave a smooth cut surface.

BRIEF DESCRIPTION OF THE DRAWINGS

FIG. 2 is a top plan elevation of a portion of the assembly of FIG. 1;
FIG. 3 is a side elevation, partly in section, showing a portion of the assembly of FIG. 1.

DESCRIPTION OF THE PREFERRED EMBODIMENT

Figure 1:
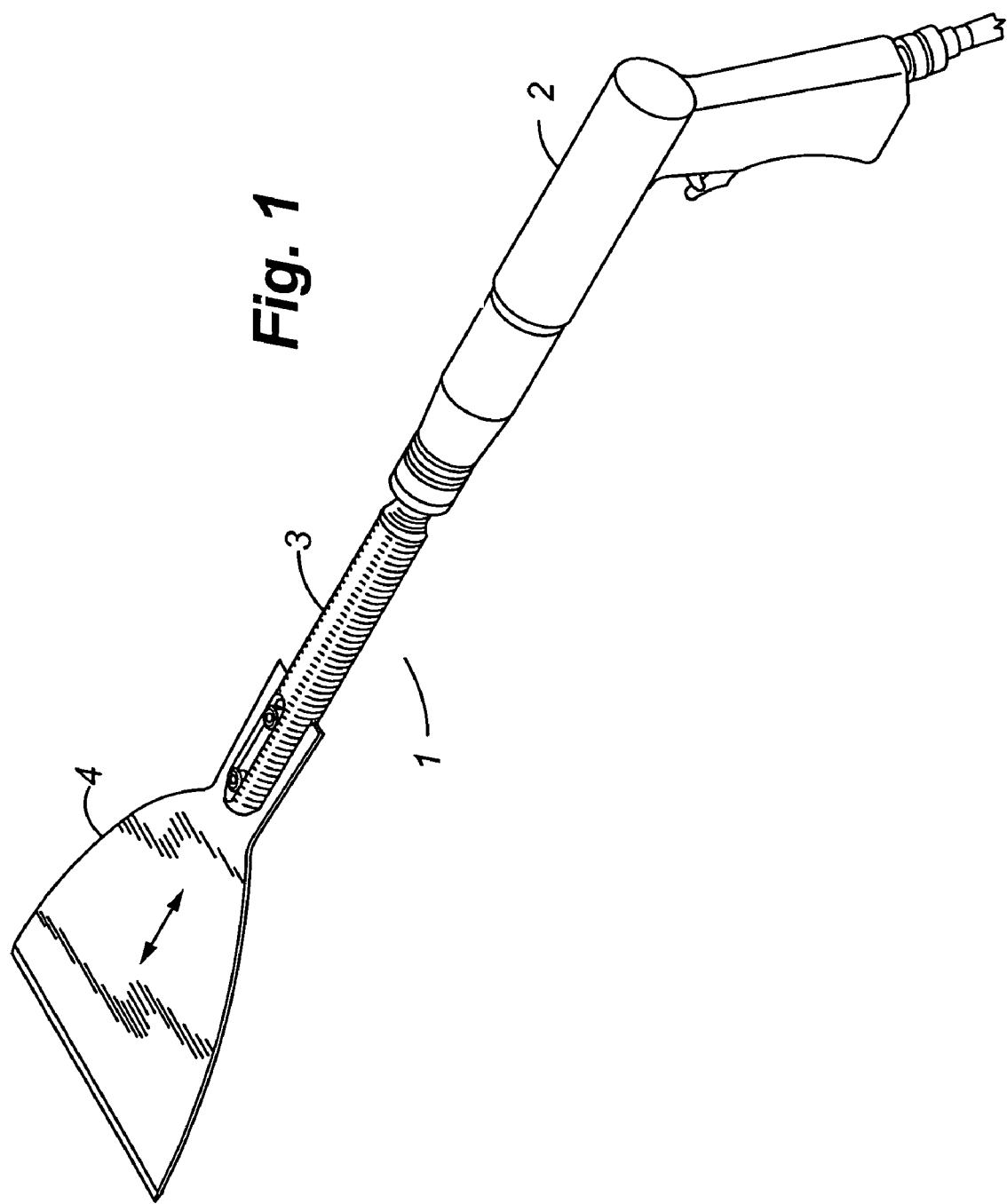
FIG. 1 is an isometric view showing the cutting assembly.
Figure 4:
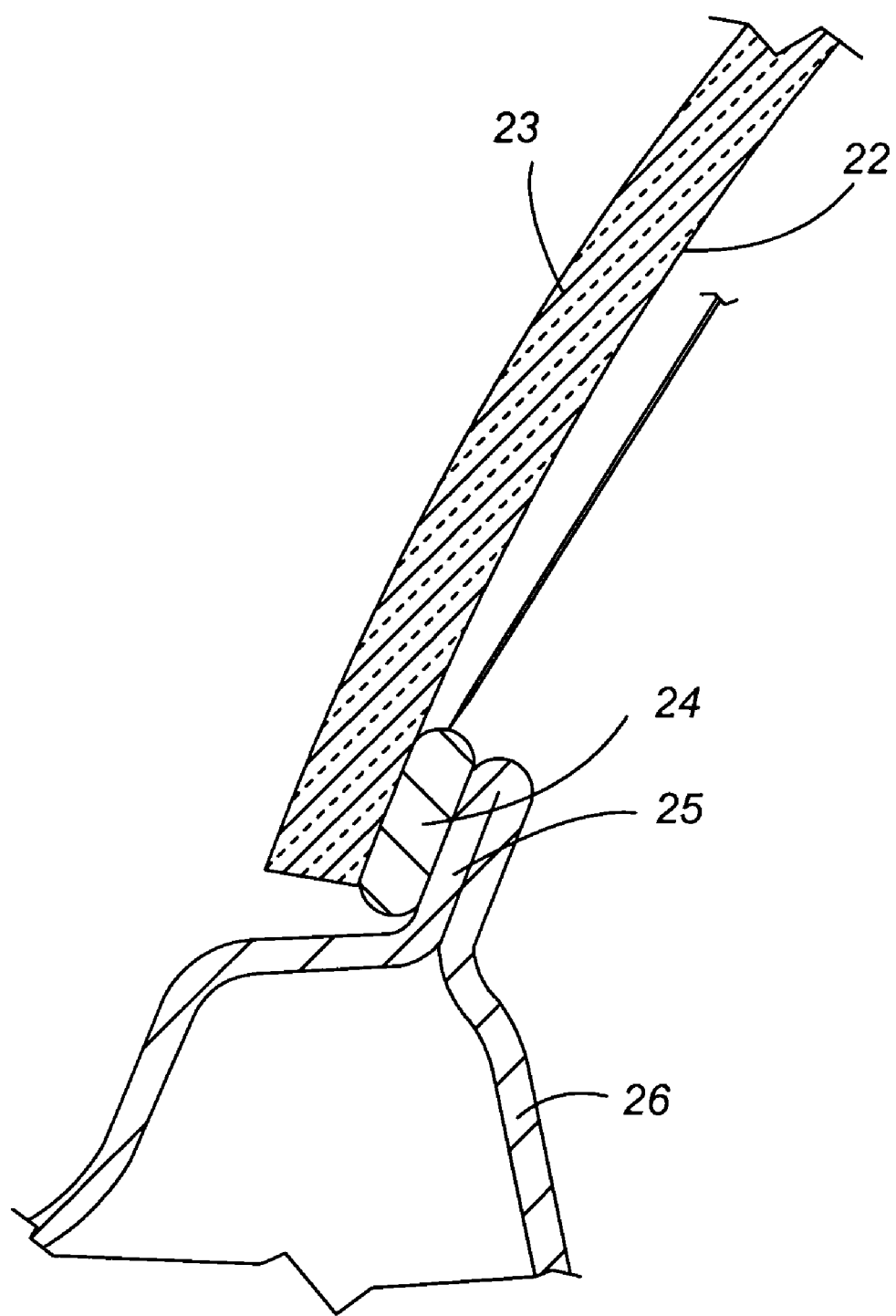
FIG. 4 is a schematic side view showing the cutting assembly in use.

The cutting assembly 1 comprises a reciprocating air gun 2 and a cutting tool comprised of a shaft 3 and blade 4.

The air gun 2 is commercially available. An Ingersoll Rand Pneumatic model #117 or a Chicago Pneumatic model # CP715 gun is suitable. These guns can deliver high impact strokes to advance the blade 4 through the urethane bed 24.

The shaft 3 is a ¾ inch diameter steel rod having an inner end 5 conventionally shaped to connect with the air gun 2. At its outer end 6, a slot 7 extends inwardly to receive the shank 8 of the blade 4. The upper surface of the rod end 6 forms a recess 9. The rod end 6 further forms bolt holes 10 extending transversely therethrough. Nuts 11 and bolts 12 are received in the recess 9 and holes 10 to secure the blade shank 8 to the rod end 6.

The blade 4 is substantially bell-shaped, is formed of stainless steel, has a width at the front edge 20 of about 4 inches, a length of 6 inches and a thickness of 0.05 inches. While it is substantially rigid, it has sufficient lateral flexibility so that it will conform to the windshield curvature when pressed thereagainst. The blade 4 includes a 2 inch long shank 8 which is received in the rod slot 7. The blade 4 narrows from front to rear and its shank 8 has about the same width as the shaft 3, so that there are no significant lateral protuberances at the connection point. More specifically, the front edge 20 is beveled on one side only to produce a top unsharpened edge which bears against the glass of the windshield and a bottom sharpened cutting edge which penetrates the urethane bed 24 when the assembly is in use. The front edge 20 is straight and sharpened.

When assembled and operated, the blade 4 reciprocates with a throw or travel of about ½ inch. The blade is pressed against the inside surface 22 of the glass windshield 23 and is driven into the urethane bed 24. It severs the bed just beneath the glass. The installer moves the assembly along the length of the bed by withdrawing the blade from the urethane, moving it to the next adjacent cut position and then again driving the blade in. The installer can also use water without lubricant as a cooling agent while cutting the urethane bed.

What is claimed is:

1. A windshield removal assembly for cutting a urethane bed securing a glass windshield having a curved surface to a vehicle at an edge of a windshield opening formed by the vehicle, there being a narrowing apex space between the windshield and a vehicle part forming the opening, comprising:

a reciprocating air gun;
a rigid, elongated shaft having inner and outer ends and being connected at its inner end with the gun for reciprocation thereby; and
a flat thin steel blade of substantially constant thickness, said blade having front and rear ends, the blade rear end being connected to the shaft's outer end, the blade being substantially coplanar with the shaft, the blade having a substantially straight front edge which is beveled on one side only to provide a non-sharpened top edge and a sharpened bottom cutting edge, the blade narrowing from its front end to its rear end to about the width of the shaft, the blade being sufficiently rigid to cut the urethane bed when reciprocated by the air gun but having sufficient lateral flexibility to conform to the curved surface of the windshield when pressed there against;

the shaft being operative to space the blade from the gun sufficiently to allow the assembly to be used within the confines of the apex space;

the air gun being operative to reciprocate the shaft and blade with sufficient force to advance the blade through the urethane bed;

the blade being configured so that the non-sharpened top edge of the blade can be pressed against the glass of the windshield while the sharpened bottom cutting edge penetrates the urethane bed.

2. The windshield removal assembly as set forth in claim 1, wherein the blade has a thickness of about 0.05 inches and a length of about 6 inches, and the blade front cutting edge has a width of about 4 inches.

3. The windshield removal assembly as set forth in claim 1, wherein the air gun has a stroke length of about 0.5 inches.

4. The windshield removal assembly as set forth in claim 1, wherein the outer end of the shaft further comprises:

a slot for receiving a shank of the blade;

a recess on a first side of the shaft; and a plurality of bolt holes passing transversely from a second side of the shaft to the first side of the shaft and intersecting the slot and the recess, the bolt holes having a countersunk portion on the second side of the shaft.

* * * * *